United States Patent
Jamadagni et al.

(10) Patent No.: US 9,084,223 B2
(45) Date of Patent: Jul. 14, 2015

(54) METHOD AND APPARATUS FOR PROVIDING MULTI-MEDIA BROADCAST MULTICAST SERVICES DATA TO USER EQUIPMENT OVER RELAY NODES

(75) Inventors: Satish Nanjunda Swamy Jamadagni, Bangalore (IN); Rahul Suhas Vaidya, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 209 days.

(21) Appl. No.: 13/876,994

(22) PCT Filed: Sep. 30, 2011

(86) PCT No.: PCT/KR2011/007286
§ 371 (c)(1),
(2), (4) Date: Mar. 29, 2013

(87) PCT Pub. No.: WO2012/044129
PCT Pub. Date: Apr. 5, 2012

(65) Prior Publication Data
US 2013/0182631 A1 Jul. 18, 2013

(30) Foreign Application Priority Data
Sep. 30, 2010 (IN) .......................... 2910/CHE/2010

(51) Int. Cl.
*H04W 72/00* (2009.01)
*H04B 7/155* (2006.01)
*H04W 4/06* (2009.01)
*H04W 56/00* (2009.01)
*H04W 52/40* (2009.01)

(52) U.S. Cl.
CPC ......... *H04W 72/005* (2013.01); *H04B 7/15592* (2013.01); *H04W 4/06* (2013.01); *H04W 56/001* (2013.01); *H04W 52/40* (2013.01)

(58) Field of Classification Search
CPC . H04W 72/005; H04W 56/001; H04W 52/40; H04W 4/06; H04L 1/0002; H04L 1/0017; H04L 1/0026; H04L 1/0083; H04L 5/0007
USPC ............. 370/312–347, 442, 470; 45/3.01, 69, 45/450, 464, 509, 526, 522
See application file for complete search history.

(56) References Cited

U.S. PATENT DOCUMENTS 7,177,658 B2 * 2/2007 Willenegger et al. ......... 455/522
7,583,977 B2 * 9/2009 Willenegger et al. ......... 455/522

(Continued)

FOREIGN PATENT DOCUMENTS

WO 2010/013980 A2 2/2010
WO 2010/016693 A2 2/2010

OTHER PUBLICATIONS

C-G. Wang et al, Based on MBMS: A general structure design of relay network for cellular system, 2009 5th International Conference on Wireless Communications, Networking and Mobile Computing (WiCOM '09), Sep. 26, 2009, pp. 1-4.

*Primary Examiner* — Afsar M Qureshi
(74) *Attorney, Agent, or Firm* — Jefferson IP Law, LLP

(57) ABSTRACT

A method and apparatus for providing Multi-media Broadcast Multicast Services (MBMS) data to user equipment in a Multi-media Broadcast over a Single Frequency Network (MBSFN) environment over relay nodes are provided. The method includes periodically evaluating a synchronization delay associated with relay nodes in an MBSFN area by a DeNB, and assigning resources to the relay nodes for communicating MBMS data. The method also includes setting a time stamp in synchronization packets based on the synchronization delay. The time stamp information may indicate a start time for synchronized transmission of the MBMS data to user equipment in the MBSFN area over an air interface. The method may further include transmitting the synchronization packets including the MBMS data and time stamp information to the relay nodes using the allocated resources such that the MBMS data is synchronously transmitted to the user equipment by the relay nodes.

16 Claims, 9 Drawing Sheets

(56) References Cited

U.S. PATENT DOCUMENTS

| | | | |
|---|---|---|---|
| 2003/0207696 A1* | 11/2003 | Willenegger et al. | 455/522 |
| 2008/0101282 A1* | 5/2008 | Ogura | 370/328 |
| 2009/0010196 A1* | 1/2009 | Bui et al. | 370/312 |
| 2010/0172279 A1* | 7/2010 | Chen et al. | 370/312 |
| 2010/0315988 A1* | 12/2010 | Chen | 370/312 |
| 2011/0026464 A1* | 2/2011 | Chen et al. | 370/328 |
| 2011/0128893 A1* | 6/2011 | Park et al. | 370/279 |

* cited by examiner

METHOD AND APPARATUS FOR PROVIDING MULTI-MEDIA BROADCAST MULTICAST SERVICES DATA TO USER EQUIPMENT OVER RELAY NODES

PRIORITY

This application is a National Stage application under 35 U.S.C. §371 of an International application filed on Sep. 30, 2011 and assigned application No. PCT/KR2011/007286, and claims the benefit under 35 U.S.C. §365(b) of an Indian patent application filed on Sep. 30, 2010 in the Indian Intellectual Property Office and assigned Serial No. 2910/CHE/2010, the entire disclosure of which is hereby incorporated by reference.

BACKGROUND OF THE INVENTION

1. Field of the Invention

The present invention relates to the field of Multi-media Broadcast/Multicast Services (MBMS). More particularly, the present invention relates to providing MBMS data to user equipment in a Multi-media Broadcast over a Single Frequency Network area.

2. Description of the Related Art

In a Multi-media Broadcast over a Single Frequency Network (MBSFN), Multi-media Broadcast/Multicast Services (MBMS) provide simultaneous delivery of multimedia content (e.g., television content, films, news content) to a large set of user equipment in an MBSFN area via a group of cells. The multi-media broadcast services can be received by any subscriber (e.g., user equipment) located in the MBSFN area in which the service is offered while the multi-media multicast services can only be received by user equipment having subscribed to the MBMS and having joined the multicast group associated with the MBMS. Both services are unidirectional point-to-multipoint transmissions of MBMS data and can be applied to broadcast text, audio, picture, video from Broadcast Multicast Service Centre (BM-SC) to any user located in the service area.

Typically, a group of cells in the MBSFN area are configured to provide MBMS data to user equipment in a time synchronized manner. The group of cells has the same frequency band allocated with contiguous coverage such that the cells are able to be synchronized and have the capability of transmitting MBMS data in a single frequency network mode.

In E-UTRAN, also known as Long Term Evolution (LTE), self backhauling is a relaying technique in which a wireless base station is wirelessly connected to the remaining part of a network via another cell which is controlled by an evolved Node B (eNB), commonly known as Donor eNB (DeNB). A wireless base station (also known as a relay node) may constitute one or more cell of its own or may be used to extend cells covered by the DeNB.

The self-backhauling concept implies that the link between the donor eNB and the relay node can operate in the same frequency spectrum, i.e. frequency-overlapped with the radio access links that provide access for User Equipment (UEs) within the donor cell and the UEs within the cell(s) controlled by the relay node. Typically, the radio technology used for the self-backhaul link is similar to the one used within the donor cell and the cell(s) of the relay node respectively. For example, when the donor eNB and the relay node use the LTE radio access technology for communicating with UEs within their cell(s), the self-backhaul link should also be LTE-based or at least based on an LTE-like radio technology.

Multiple such relay nodes may be employed under a single DeNB to extend cells covered by the DeNB. The relay nodes associated with the DeNB may be a part of an MBSFN area that includes eNBs and DeNBs. Alternatively, the relay nodes associated with the DeNB can be a part of separate MBSFN area as illustrated in FIG. 1.

FIG. 1 is a schematic diagram illustrating an MBSFN environment in which relay nodes are part of separate MBSFN area according to the related art.

Referring to FIG. 1, currently, none of the relay nodes are used for synchronized transmission of MBMS data to its UEs along the eNBs and the DeNBs in an MBSFN area. This is due to the fact that an MBMS Control Entity (MCE) (e.g., entity responsible for allocation of time and frequency resources for MBMS data transmission) is not connected to the relay nodes in the existing 3GPP architecture and the DeNB associated with the relay nodes does not have appropriate capabilities to provide the MBMS data to user equipment connected through relay nodes in a synchronized manner.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below.

An aspect of the present invention is to provide a method and system for providing Multi-media Broadcast Multicast Services (MBMS) data to user equipment over relay nodes.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
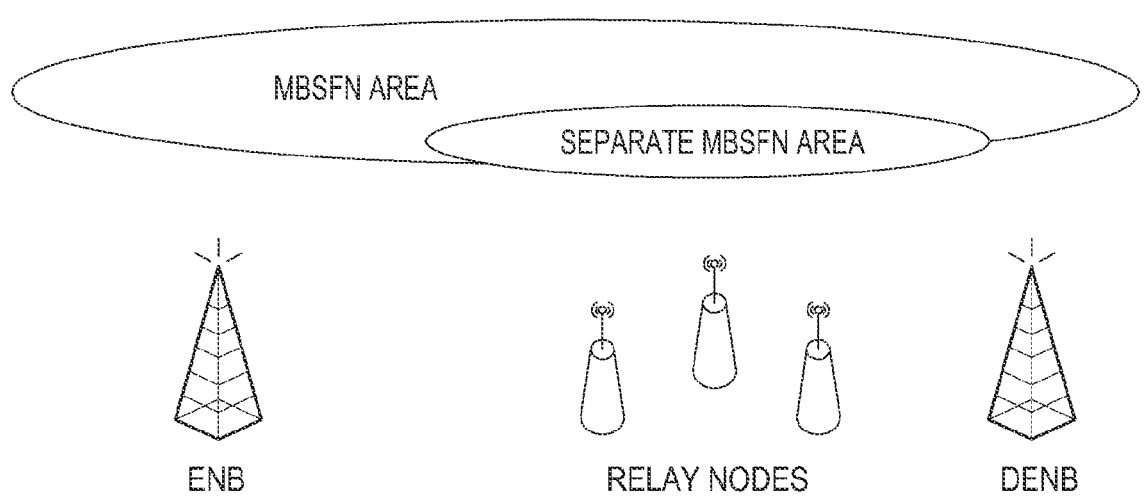
FIG. 1 is a schematic diagram illustrating a Multi-media Broadcast over a Single Frequency Network (MBSFN) environment in which relay nodes are part of separate MBSFN area according to the related art.
Figure 2:
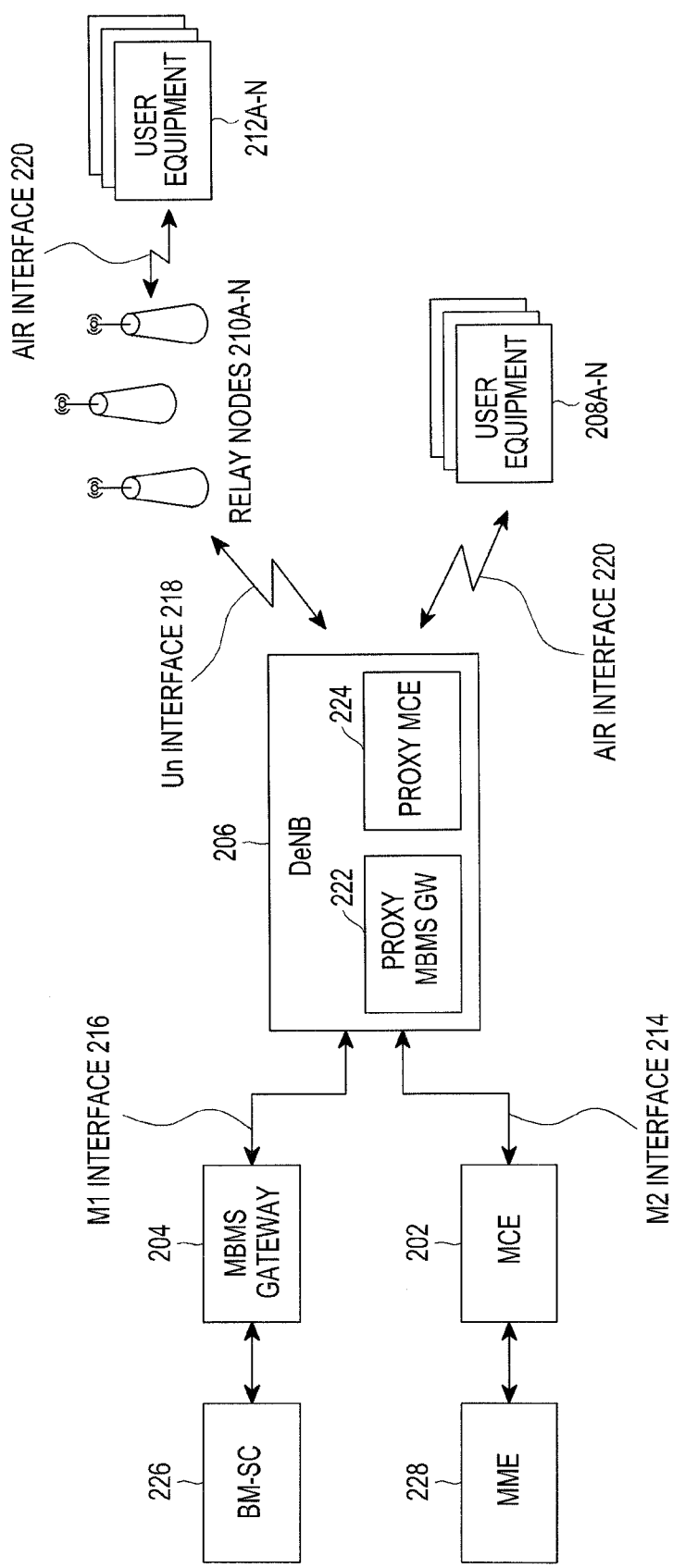
FIG. 2 illustrates a block diagram of a wireless communication system for providing Multi-media Broadcast Multicast Services (MBMS) data to user equipment via relay nodes according to an exemplary embodiment of the present invention.

FIG. 2 illustrates a block diagram of a wireless communication system for providing Multi-media Broadcast Multicast Services (MBMS) data to user equipment via relay nodes according to an exemplary embodiment of the present invention.

Referring to FIG. 2, a wireless communication system 200 includes an MBMS Control Entity (MCE) 202, an MBMS gateway 204, a Donor evolved Node B (DeNB) 206, a first set of user equipment 208A-N, relay nodes 210A-N, a second set of user equipment 212A-N, a Broadcast Multicast Service Center (BM-SC) 226, and a Mobility Management Entity (MME) 228. The MCE 202 is connected to the DeNB 206 via an M2 interface 214 while the MBMS gateway 204 is connected to the DeNB 206 via an M1 interface 216. The DeNB 106 connects the relay nodes 210A-N via an Un interface 218. The user equipment 208A-N and 212A-N are connected to DeNB 206 and the relay nodes 210A-N through an air interface 220.

The MCE 202 is a logical entity responsible for allocation of time and frequency resources for MBMS data transmission to the DeNB 206 in an MBSFN area via the M2 interface 214. The BM-SC 226 is a functional entity configured to provide MBMS to user equipment. The MBMS gateway 204 broadcasts synchronization packets received from the BM-SC 226 to eNBs (e.g., including the DeNB 206) within an MBSFN area as well as MBMS session management (e.g., Session Start and Session Stop) via the M1 interface 216. The M1 interface 216 is an interface between the MBMS gateway 204 and the DeNB 206 that makes use of IP multicast protocol for delivery of synchronization packets to the DeNB 206.

According to exemplary embodiments of the present invention, the DeNB 206 includes a proxy MBMS gateway 222 and a proxy MCE 224. The proxy MBMS gateway 222 is configured to maintain synchronized transmission of MBMS data to the user equipment 212A-N between different relay nodes 210A-N. In one exemplary embodiment, the proxy MBMS gateway 222 can transmit the MBMS data to the relay nodes 210A-N connected to the DeNB 206 over the Un interface 218. In another exemplary embodiment, the proxy MBMS gateway 224 is configured to transmit MBMS data to the relay nodes 210A-N over dedicated bearers targeting individual relay nodes 210A-N separately. The process carried out by the proxy MBMS gateway 222 is illustrated in greater detail in FIG. 3.

The proxy MCE 224 is configured to control MBSFN configuration of the relay nodes 210A-N. In some exemplary embodiments, the proxy MCE 224 may determine number of user equipment under the control of relay nodes 210A-N and reporting the number of user equipment to the MCE 202 over the M2 interface 214. The process carried out by the proxy MCE 224 is illustrated in greater detail in FIG. 4. While the proxy MBMS gateway 222 and the proxy MCE 224 are implemented as separate entities in the DeNB 206, according to exemplary embodiments of the present invention the proxy MCE 224 may be implemented in the proxy MBMS gateway 222.

Figure 3:
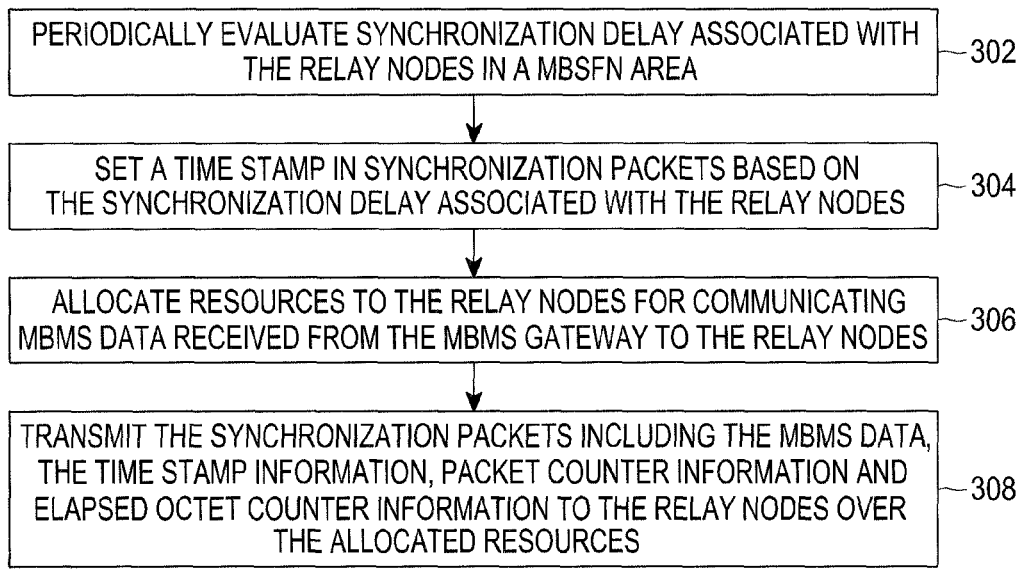
FIG. 3 illustrates a process flowchart of an exemplary method of providing MBMS data to user equipment via relay nodes in a time synchronized manner according to an exemplary embodiment of the present invention.

FIG. 3 illustrates a process flowchart of an exemplary method of providing MBMS data to user equipment via relay nodes in a synchronized manner, according to an exemplary embodiment of the present invention.

Referring to FIG. 3, at step 302, a synchronization delay associated with the relay nodes 210A-N in an MBSFN area is periodically evaluated by the proxy MBMS gateway 222 in the DeNB 206. The synchronization delay associated with the relay nodes 210A-N is determined based on delays encountered over the Un interface 218 between the DeNB 206 and the relay nodes 210A-N. At step 304, a time stamp is set in synchronization packets based on the synchronization delay associated with the relay nodes 210A-N. The time stamp information indicates a start time for synchronized transmission of the MBMS data to the user equipment 208A-N and 212A-N in the MBSFN area over the air interface 220.

At step 306, resources are allocated to the relay nodes 210A-N for communicating MBMS data received from the MBMS gateway 204 to the relay nodes 210A-N. In one exemplary embodiment, a dedicated bearer resource reservation is initiated by the proxy MBMS gateway 222A-N for providing MBMS. According to another exemplary embodiment, a particular relay node may initiate dedicated bearer resource reservation for availing MBMS. Based on the resource reservation request, the proxy MBMS gateway 222 allocates the resources for communicating the MBMS data to the particular relay node.

Figure 5A:
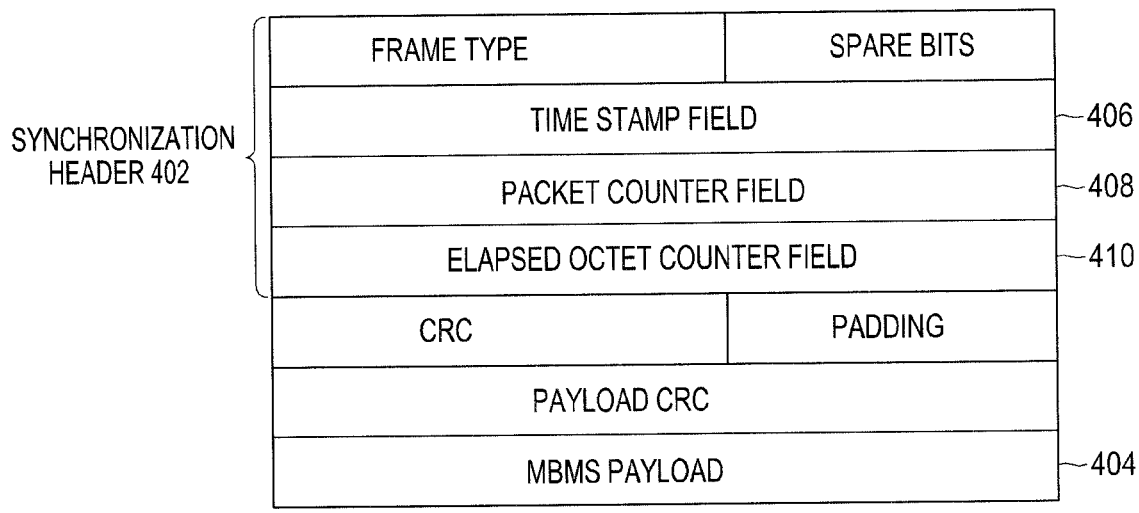
FIGS. 5A and 5B are schematic representations illustrating synchronization data packets transmitted to the relay nodes by a proxy MBMS gateway according to an exemplary embodiment of the present invention.
Figure 5B:
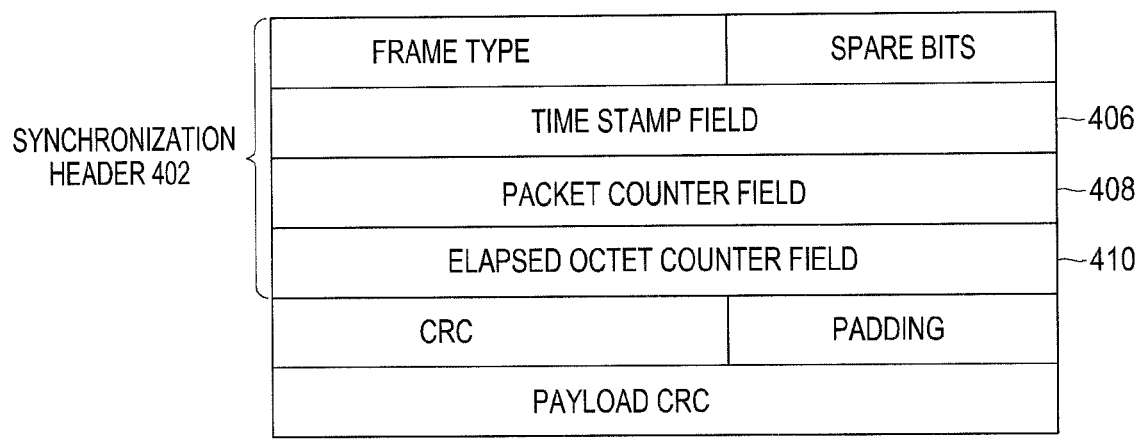

At step 308, the synchronization packets including the MBMS data, the time stamp information, packet counter information and elapsed octet counter information is transmitted to the relay nodes 210A-N by the proxy MBMS gateway 222 using the allocated resources. An exemplary synchronization packet is illustrated in FIG. 5A. Alternatively, the proxy MBMS gateway 222 may also transmit the synchronization packets without including the MBMS data to the relay nodes 210A-N as illustrated in FIG. 5B.

When each of the relay nodes 210A-N receives the synchronization packets, the relay nodes 210A-N transmit the MBMS data in the synchronization packets to respective user equipment 212A-N based on the time stamp information. The time stamp information enables the relays nodes 210A-N to start transmitting the MBMS data in a synchronized manner. Also, the DeNB 206 starts transmitting the MBMS data to the connected user equipment 208A-N substantially simultaneously to the transmission of the MBMS data by the relay nodes 210A-N based on the time stamp information. This helps maintain synchronized transmission of MBMS data between the relay nodes 210A-N within an MBSFN area.

The above description explains a scenario when the relay nodes 210A-N are part of a separate MBSFN area. When the relay nodes 210A-N are part of the same MBSFN area including eNBs (not shown) and the DeNB 206, the proxy MBMS gateway 222 ensures that the MBMS data is still transmitted to the user equipment by the eNBs, the DeNB 206 and the relays nodes 210A-N in synchronized manner. This is possible as the proxy MBMS gateway 222 communicates the synchronization delay associated with the relay nodes 210A-N to the MBMS gateway 206 over M1 interface 216. The MBMS gateway 206 considers the synchronization delay over the Un interface 218 while setting the time stamp in the synchronization packets transmitted to the eNBs, and the DeNBs in the same MBSFN area. In some cases, the BM-SC server 226 can also considers the synchronization delay over the Un interface 218 while setting the time stamp in the synchronization packets transmitted to the eNBs, and the DeNBs in the same MBSFN area.

Figure 4:
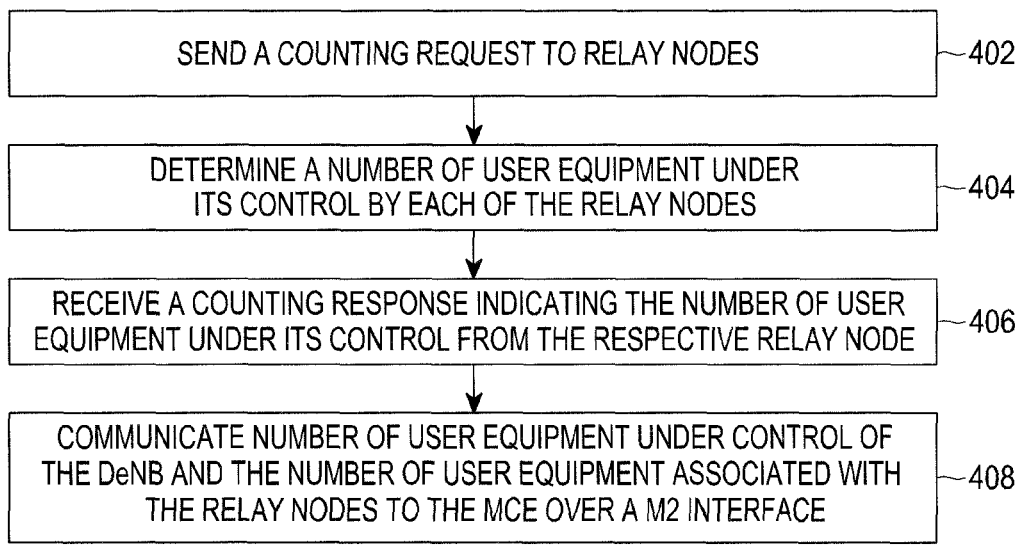
FIG. 4 is a process flowchart illustrating an exemplary method of counting a number of user equipment associated with each of a relay nodes according to an exemplary embodiment of the present invention.

FIG. 4 is a process flowchart illustrating an exemplary method of counting number of user equipment associated with each of the relay nodes 210A-N, according to an exemplary embodiment of the present invention.

Referring to FIG. 4, at step 402, a counting request is sent to each of the relay nodes 210A-N by the proxy MCE 224. At step 404, number of user equipment under its control is determined by each of the relay nodes 210A-N. The relay nodes 210A-N may then transmit the counting response message over an MBMS Control Channel (MCCH) implemented in the relay nodes 210A-N. At step 406, a counting response indicating the number of user equipment under the control of the respective relay node is received from the respective relay node. At step 408, number of user equipment under control of the DeNB 206 and the number of user equipment associated with the relay nodes 210A-N is communicated to the MCE 202 over the M2 interface 214. This is the case when the relay nodes 210A-N are part of same MBSFN area as the DeNB 206. Alternatively, when the relay nodes 210A-N are part of the separate MBSFN area, the DeNB 206 communicates the number of user equipment under its control to the MCE 202 while the proxy MCE 224 in the DeNB 206 communicates the number of user equipment under the control of relay nodes 210A-N to the MCE 202.

FIGS. 5A and 5B are schematic representations illustrating synchronization data packets transmitted to relay nodes by a proxy MBMS gateway according to an exemplary embodiment of the present invention.

Referring to FIG. 5A, the synchronization data packet 500 includes a synchronization header 402 and an MBMS payload 404. The synchronization header 402 mainly includes a time stamp field 406, a packet counter field 408, and an elapsed octet counter field 410. The time stamp field 406 includes time stamp information modified based on the synchronization delay. The packet counter field 508 indicates total number of packet counter while the elapsed octet counter field 510 indicates elapsed octet counter. Further, the MBMS payload field 504 includes MBMS data. The synchronization packet 550 of FIG. 5B is similar to the synchronization packet 500 of FIG. 5A except that the synchronization packet 550 does not include the MBMS payload 504.

Figure 6:
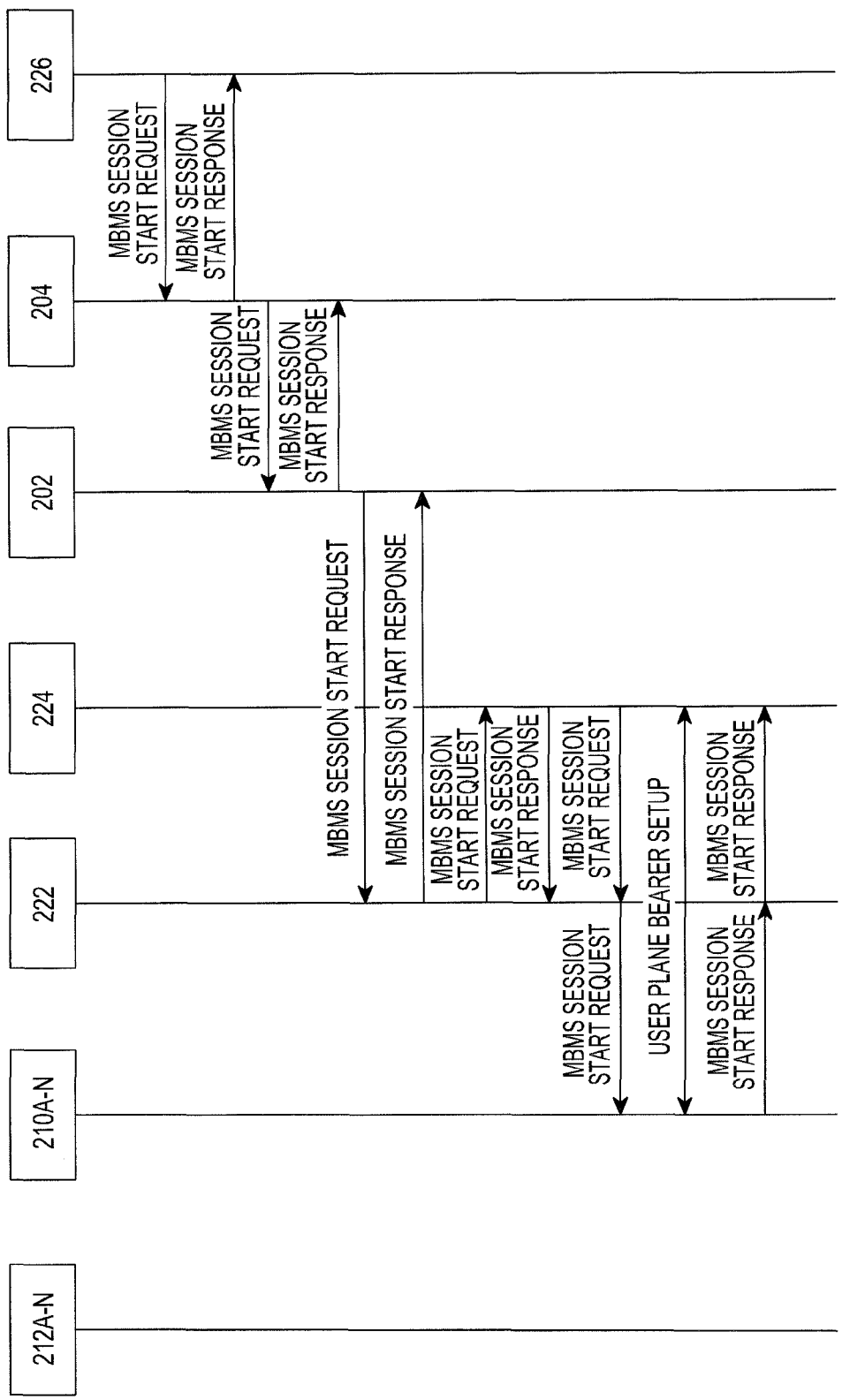
FIG. 6 is a flow diagram illustrating an exemplary method of initiation of an MBMS session for providing MBMS data to user equipment via relay nodes, according to an exemplary embodiment of the present invention.

FIG. 6 is a flow diagram illustrating an exemplary method of initiation of a MBMS session for providing MBMS data to user equipment via relay nodes, according to an exemplary embodiment of the present invention.

Figure 7:
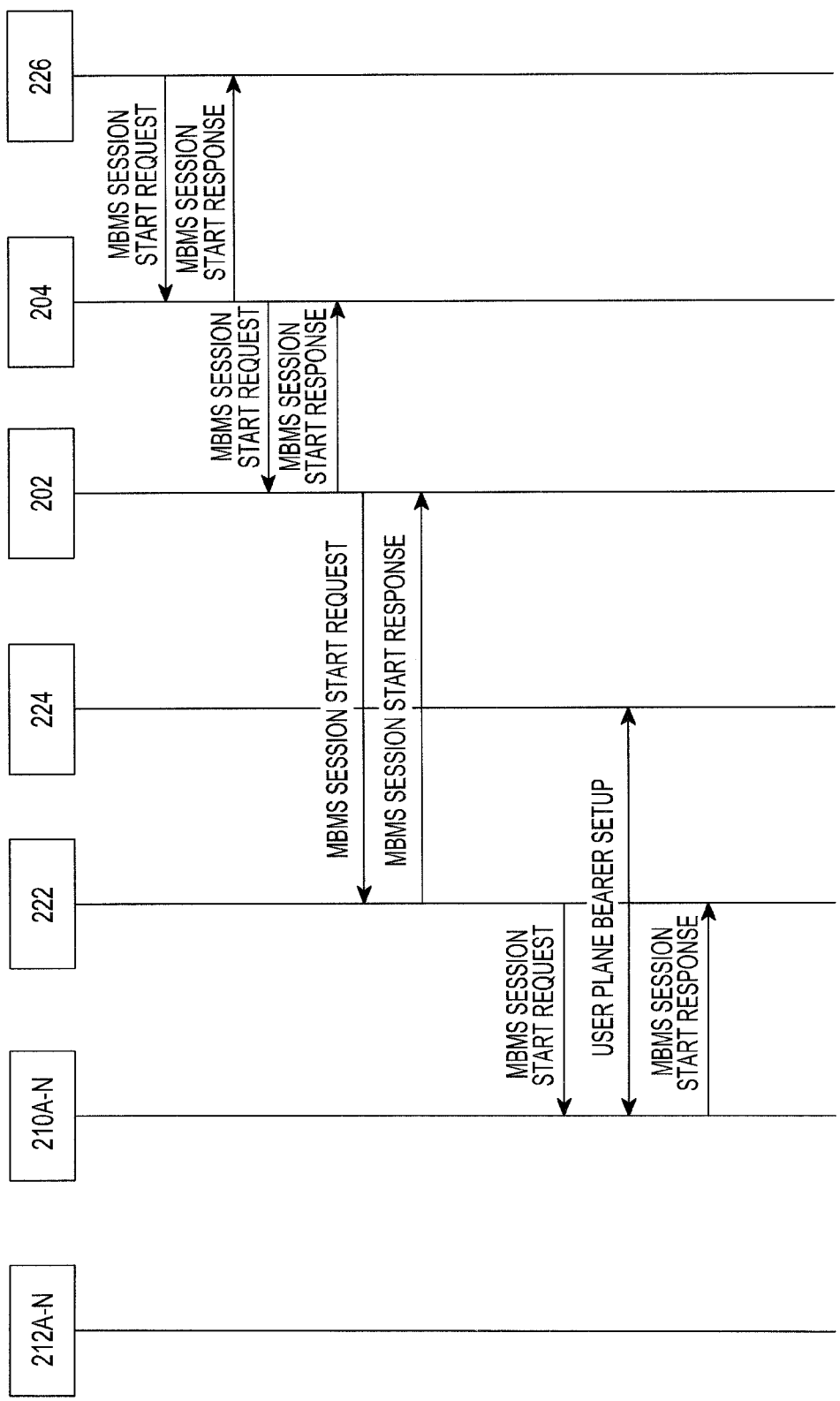
FIG. 7 is a flow diagram illustrating an exemplary method of initiation of an MBMS session for providing MBMS data to user equipment via relay nodes, according to an exemplary embodiment of the present invention.

FIG. 7 is a flow diagram illustrating an exemplary method of initiation of an MBMS session for providing MBMS data to user equipment via relay nodes, according to an exemplary embodiment of the present invention.

Figure 8:
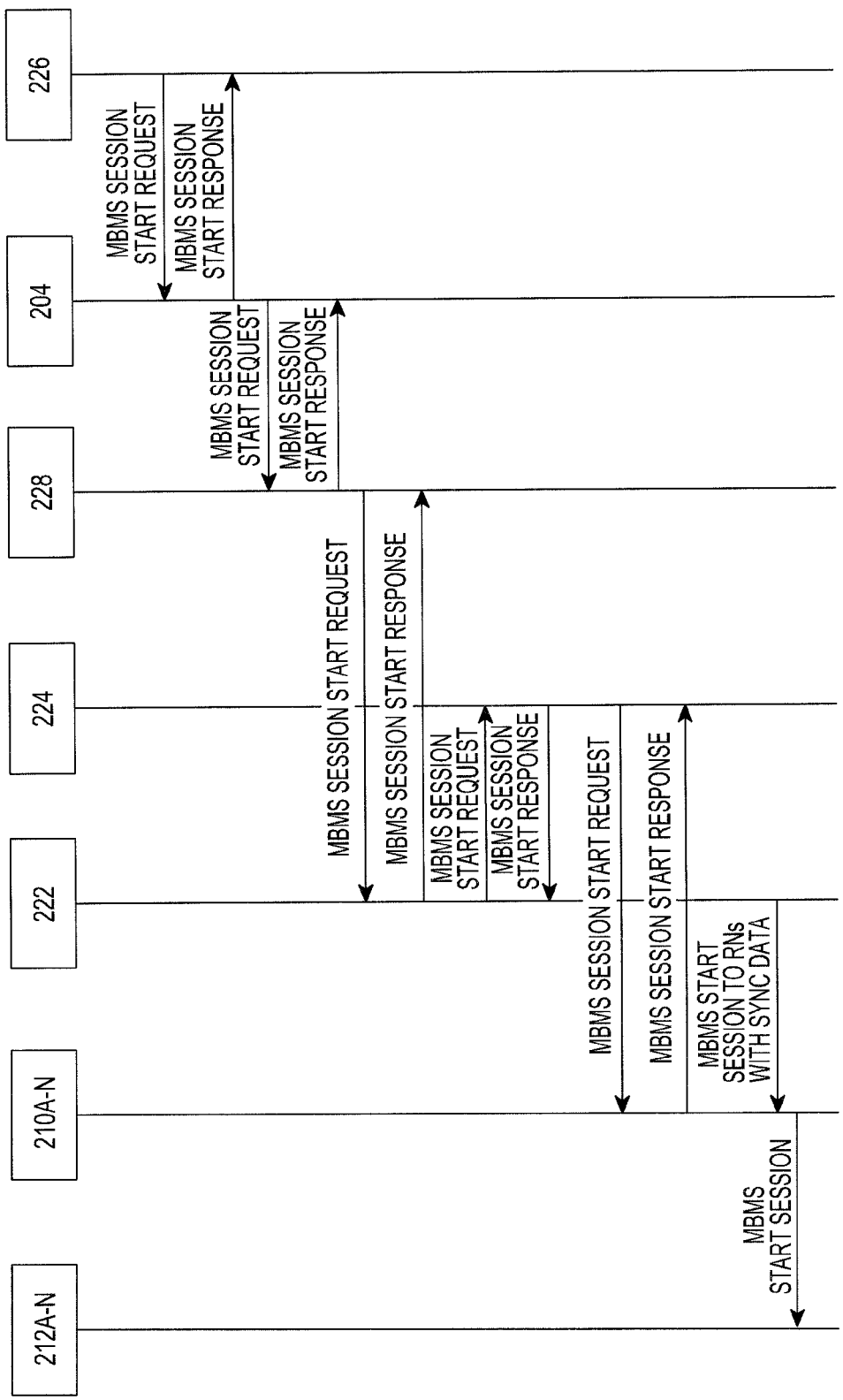
FIG. 8 is a flow diagram illustrating an exemplary method of initiation of an MBMS session for providing MBMS data to user equipment via relay nodes, according to an exemplary embodiment of the present invention.

FIG. 8 is a flow diagram illustrating an exemplary method of initiation of an MBMS session for providing MBMS data to user equipment via relay nodes according to an exemplary embodiment of the present invention.

Figure 9:
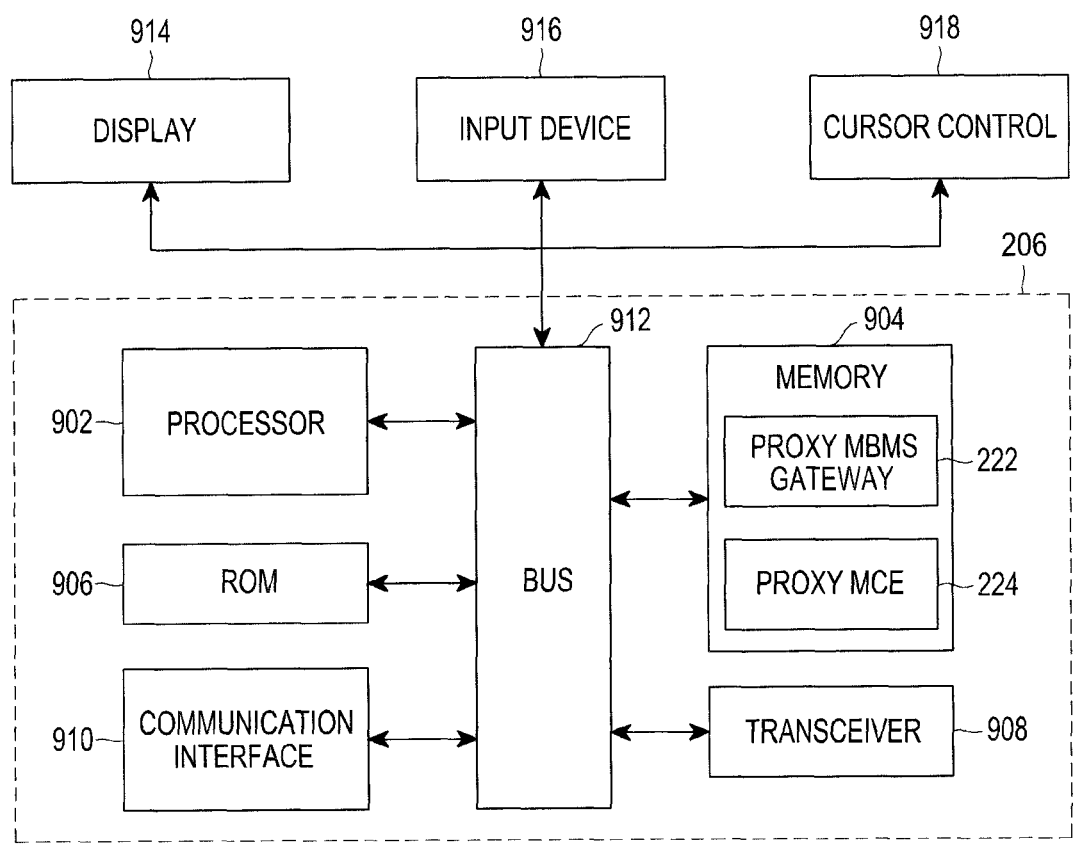
FIG. 9 illustrates a block diagram of a donor evolved Node B according to an exemplary embodiment of the present invention.

FIG. 9 illustrates a block diagram of a DeNB 206 showing various components for implementing embodiments of the present subject matter.

Referring to FIG. 9, the DeNB 206 includes a processor 902, memory 904, a Read Only Memory (ROM) 906, a transceiver 908, a communication interface 910, a bus 912, a display 914, an input device 916, and a cursor control 918.

The processor 902, as used herein, may be any type of computational circuit, including, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 902 may also include embedded controllers, such as generic or programmable logic devices or arrays, application specific integrated circuits, single-chip computers, smart cards, and the like.

The memory 904 may be volatile memory and/or non-volatile memory. The memory 904 includes the proxy MBMS gateway 222 and the proxy MCE 224 for providing MBMS data to the user equipment 212A-N via the relay nodes 210A-N, according to the exemplary embodiments of the present subject matter. A variety of computer-readable storage media may be stored in and accessed from the memory elements. Memory elements may include any suitable memory device(s) for storing data and machine-readable instructions, such as read only memory, random access memory, erasable programmable read only memory, electrically erasable programmable read only memory, hard drive, removable media drive for handling memory cards, Memory Sticks, and the like.

Exemplary embodiments of the present subject matter may be implemented in conjunction with modules, including functions, procedures, data structures, and application programs, for performing tasks, or defining abstract data types or low-level hardware contexts. Machine-readable instructions stored on any of the above-mentioned storage media may be executable by the processor 902. For example, a computer program may include machine-readable instructions capable of providing MBMS data to the user equipment 212A-N via the relay nodes 210A-N in a synchronized manner, according to the exemplary embodiments of the invention described herein. In one exemplary embodiment, the computer program may be included on a non-transitory storage medium and loaded from the storage medium to a hard drive in the non-volatile memory.

It is appreciated that the components such as the transceiver 908, communication interface 910, the display 914, the input device 916, and the cursor control 918 are well known to the person skilled in the art and hence the explanation is thereof omitted.

The present exemplary embodiments have been described with reference to specific example exemplary embodiments. It will be evident that various modifications and changes may be made to these exemplary embodiments without departing from the broader spirit and scope of the various exemplary embodiments. Furthermore, the various devices, modules, selectors, estimators, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

While the invention has been shown and described with reference to certain exemplary embodiments thereof, it will be understood by those skilled in the art that various changes in form and details may be made therein without departing from the spirit and scope of the invention as defined by the appended claims and their equivalents.

The invention claimed is:

1. A method of providing Multi-media Broadcast Multicast Services (MBMS) to user equipment in a Multi-media Broadcast over a Single Frequency Network (MBSFN) environment via relay nodes, the method comprising:
    periodically evaluating a synchronization delay associated with at least one relay node in an MBSFN area by a Donor evolved Node B (DeNB);
    assigning resources to the at least one relay node for communicating MBMS data; and
    transmitting the MBMS data to the at least one relay node using assigned resources based on the synchronization delay associated with the at least one relay node.

2. The method of claim 1, further comprising:
    periodically communicating the synchronization delay associated with the at least one relay node to an MBMS gateway over an M1 interface.

3. The method of claim 2, wherein the synchronization delay is evaluated based on delays encountered over an Un interface connecting the DeNB and the at least one relay node.

4. The method of claim 1, further comprising:
    setting a time stamp in at least one synchronization packet based on the synchronization delay associated with the at least one relay node,
    wherein the time stamp information indicates a start time for synchronized transmission of the MBMS data to user equipment in the MBSFN area over an air interface.

5. The method of claim 1, further comprising:
    transmitting the at least one synchronization packet including the time stamp information, packet counter information, and elapsed octet counter information to the at least one relay node over an Un interface.

6. The method of claim 3, wherein the transmitting of the MBMS data to the at least one relay node based on the synchronization delay associated with the at least one relay node comprises:
    transmitting the at least one synchronization packet to the at least one relay node,
    wherein the at least one synchronization packet includes the MBMS data, the time stamp information, packet counter information, and elapsed octet counter information.

7. The method of claim 5, wherein the transmitting of the at least one synchronization packet to the at least one relay node comprises:
    relaying the MBMS data in the at least one synchronization packet to the user equipment by the at least one relay node based on the time stamp information.

8. The method of claim 1, wherein the transmitting of the MBMS data to the at least one relay node based on the synchronization delay associated with the at least one relay node comprises:
    transmitting the MBMS data to the at least one relay node based on the synchronization delay such that the at least one relay node and the DeNB substantially simultaneously transmits the MBMS data to user equipment associated with the at least one relay node and user equipment directly connected to the DeNB in a synchronized manner.

9. The method of claim 1, further comprising:
    determining a number of user equipment serviced by the at least one relay node and the DeNB respectively; and
    communicating the number of user equipment directly served by the at least one relay node and the DeNB to an MBMS Control Entity (MCE) over an M2 interface.

10. An apparatus comprising:
    a processor; and
    a memory coupled to the processor,
    wherein the memory comprises a proxy Multi-media Broadcast Multicast Services (MBMS) gateway capable of:
        periodically evaluating a synchronization delay associated with at least one relay node in a Multi-media Broadcast over a Single Frequency Network (MBSFN) area;
        assigning resources to the at least one relay node for communicating multi MBMS data, and
        transmitting the MBMS data to the at least one relay node using assigned resources based on the synchronization delay associated with the at least one relay node such that the MBMS data is relayed to user equipment by the at least one relay node in a synchronized manner.

11. The apparatus of claim 10, wherein the proxy MBMS gateway is configured to periodically communicate the synchronization delay associated with the at least one relay node to an MBMS gateway over a M1 interface.

12. The apparatus of claim 11, wherein the proxy MBMS gateway is configured to evaluate the synchronization delay based on delays encountered over an Un interface.

13. The apparatus of claim 10, wherein the proxy MBMS gateway is configured to set a time stamp in at least one synchronization packet based on the synchronization delay associated with the at least one relay node,
    wherein the time stamp information indicates start time for synchronized transmission of the MBMS data to user equipment in the MBSFN area over an air interface.

14. The apparatus of claim 13, wherein the proxy MBMS gateway is configured to transmit the at least one synchronization packet including the time stamp information, packet counter information, and elapsed octet counter information to the at least one relay node over an Un interface.

15. The apparatus of claim 13, wherein the proxy MBMS gateway is configured to transmit the at least one synchronization packet to the at least one relay node,
   wherein the at least one synchronization packet includes the MBMS data, the time stamp information, packet counter information, and elapsed octet counter information.

16. The apparatus of claim 10, wherein the memory further comprises a proxy MBMS Control Entity (MCE) configured to:
   determine a number of user equipment serviced by the at least one relay node; and
   communicate the number of user equipment directly served by the at least one relay node to a MCE over a M2 interface.

* * * * *